(12) United States Patent
Wong et al.

(10) Patent No.: US 8,212,202 B2
(45) Date of Patent: Jul. 3, 2012

(54) REFLECTIVE OPTICAL ENCODER PACKAGE AND METHOD

(75) Inventors: Weng Fei Wong, Gelugor (MY); Cheng Kwong Cheang, Bayan Lepas (MY)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 547 days.

(21) Appl. No.: 12/350,946

(22) Filed: Jan. 8, 2009

(65) Prior Publication Data

US 2010/0171028 A1 Jul. 8, 2010

(51) Int. Cl.
*G01D 5/34* (2006.01)
*H01J 40/14* (2006.01)

(52) U.S. Cl. .................. 250/231.13; 250/239

(58) Field of Classification Search ............ 33/700, 33/706, 707; 341/13, 14; 250/216, 231.1, 250/231.16, 239, 568, 551; 257/431–436; 356/616, 617
See application file for complete search history.

(56) References Cited

U.S. PATENT DOCUMENTS

| | | | |
|---|---|---|---|
| 4,451,731 A | 5/1984 | Leonard | |
| 4,587,513 A * | 5/1986 | Burrowes et al. | 341/13 |
| 6,410,911 B1 * | 6/2002 | Omi | 250/231.13 |
| 6,791,699 B2 * | 9/2004 | Aoki | 356/616 |
| 6,972,402 B2 * | 12/2005 | Ohmura et al. | 250/231.13 |
| 7,102,123 B2 * | 9/2006 | Chin et al. | 250/231.13 |
| 7,182,258 B2 | 2/2007 | Foo et al. | |
| 7,220,960 B2 * | 5/2007 | Ito | 250/231.13 |
| 7,342,671 B2 | 3/2008 | Ito et al. | |
| 7,385,178 B2 * | 6/2008 | Chin et al. | 250/231.14 |
| 7,394,061 B2 | 7/2008 | Saidan et al. | |
| 7,400,269 B2 | 7/2008 | Wong et al. | |
| 7,544,925 B2 * | 6/2009 | Mizuno et al. | 250/231.18 |
| 2005/0087682 A1* | 4/2005 | Ito | 250/231.13 |
| 2006/0007451 A1 | 1/2006 | Ito | |
| 2006/0237540 A1* | 10/2006 | Saxena et al. | 235/454 |
| 2008/0024797 A1 | 1/2008 | Otsuka et al. | |

* cited by examiner

*Primary Examiner* — Georgia Y Epps
*Assistant Examiner* — Renee Naphas

(57) ABSTRACT

Disclosed are various embodiments of a reflective optical encoder package having a light emitter and a light detector disposed on an integrated circuit having an optically transparent glass layer disposed thereover. The package can be manufactured without resort to wirebonding techniques and instead can be made using wafer level packaging methods and materials. The package can also be made of lower profile or smaller footprint than many conventional optical encoder packages, and may be employed to sense or detect rotary or linear motion.

16 Claims, 7 Drawing Sheets

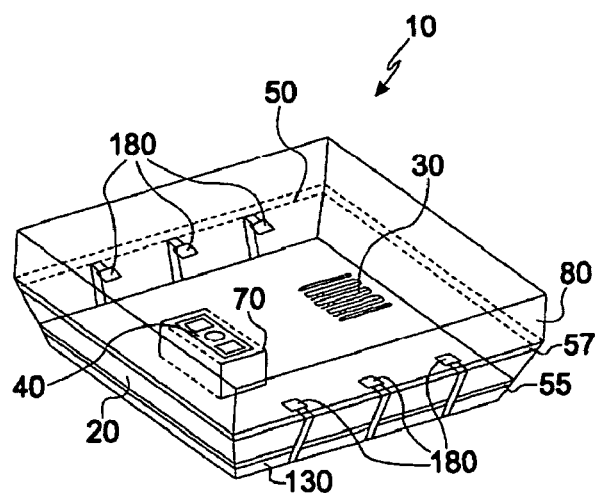
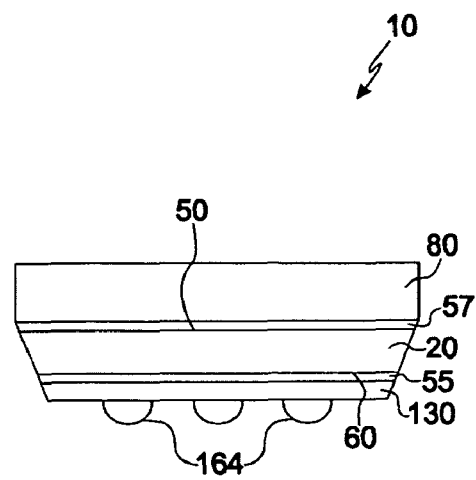
FIG. 1(a)    FIG. 1(b)
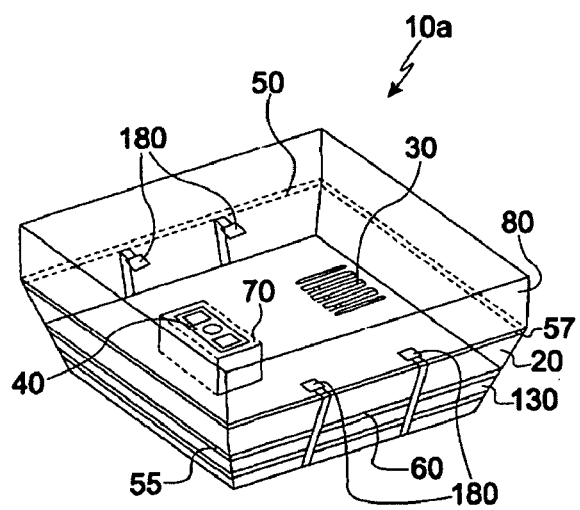
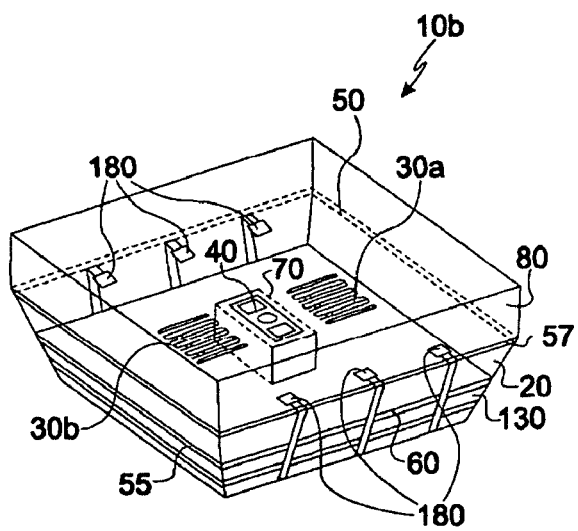
FIG. 2    FIG. 3

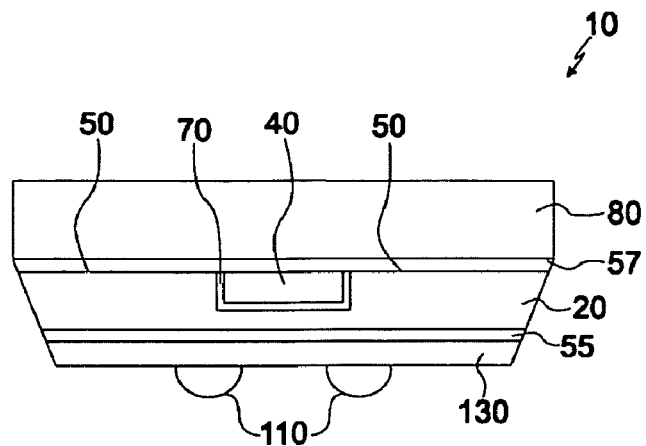
FIG. 5
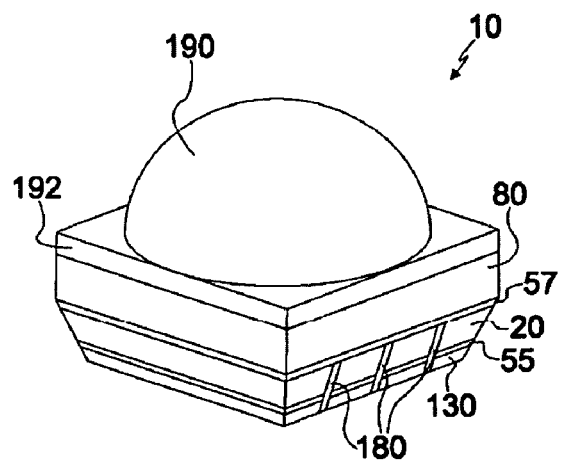 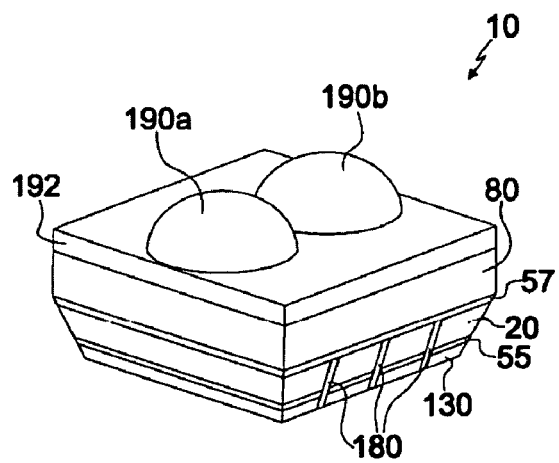
FIG. 6  FIG. 7

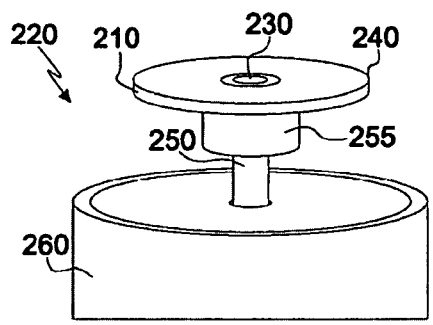
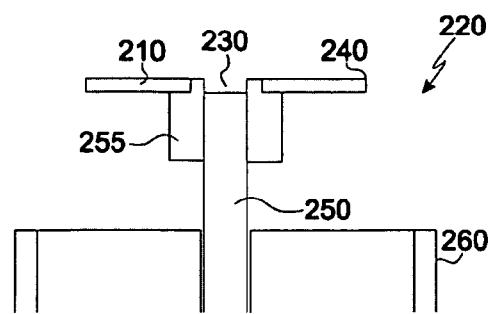
FIG. 10(a)  FIG. 10(b)
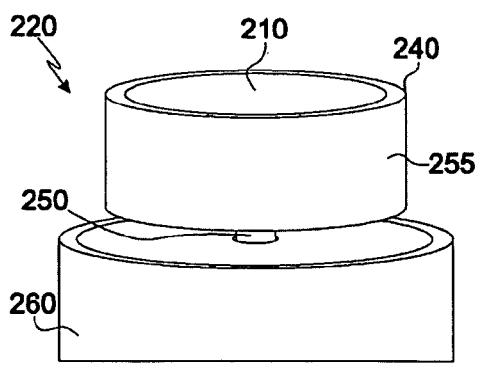
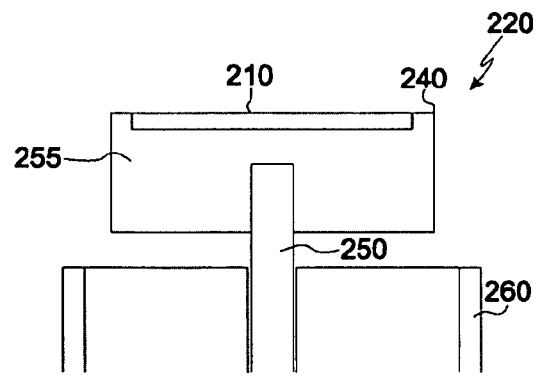
FIG. 11(a)  FIG. 11(b)

REFLECTIVE OPTICAL ENCODER PACKAGE AND METHOD

FIELD OF THE INVENTION

Various embodiments of the invention described herein relate to the field of optical encoders, and components, devices, systems and methods associated therewith.

BACKGROUND

Optical encoders are typically employed as motion detectors in applications such as closed-loop feedback control in a motor control system. Many optical encoders are configured to translate rotary motion or linear motion into a two-channel analog or digital output for position encoding using corresponding codewheels or codestrips, respectively. See, for example, the Agilent HEDS-9710, HEDS-9711 200 lpi Analog Output Small Optical Encoder Modules Data Sheet. And "A miniature Surface Mount Reflective Optical Shaft Encoder" by Krishnan et al., Article 8, December 1996 Hewlett-Packard Journal.

Many conventional transmissive optical encoders comprise a lensed LED light source or light emitter and a detector integrated circuit (IC) enclosed in a plastic package. Light emitted by the light source is collimated into a parallel beam by means of a single lens located directly over the LED. Opposite the light emitter is the detector integrated circuit, which typically comprises multiple sets of photodetectors or photodiodes and the signal processing circuitry required to produce suitable analog or digital output waveforms. When a code scale such as a code wheel or code strip moves between the light emitter and light detector, the light beam is interrupted by a pattern of bars and spaces disposed on the code scale. Similarly, in reflective or imaging encoders, the lens over an LED focuses light onto the code scale. Light is either reflected or not reflected back to the lens disposed over the photo-detector. As the code scale moves, an alternating pattern of light and dark patterns corresponding to the bars and spaces falls upon the photodiodes. The photodiodes detect these patterns and corresponding outputs are processed by the signal processor to produce digital waveforms. Such encoder outputs are used to provide information about position, velocity and acceleration of a motor, by way of example.

Transmissive optical encoders typically generate code scale images having good contrast, and hence are capable of operating at high speeds with high resolution. The high contrast characteristic of most transmissive optical encoders also permits the outputs provided thereby to be easily interpolated to higher resolution. Transmissive optical encoders usually require that light emitters be placed opposite light detectors, and thus require a relatively high profile in respect of package design.

In reflective optical encoders, the light emitter and light detector often may be placed on the same substrate, and thus low profile designs, fewer materials and shorter assembly times may be realized. Reflective optical encoders typically suffer from low contrast, which in turn leads to low speeds and low resolution.

Imaging optical encoders feature many of the same advantages as reflective optical encoders, such as low profiles and cost, but also require diffusive code wheels. In addition, imaging optical encoders suffer from low diffusive reflectance and usually cannot operate at very high speeds.

Reflective optical encoders known in the art often suffer from several performance and application problems, such the relatively low speeds and low resolution mentioned above.

Various patents containing subject matter relating directly or indirectly to the field of the present invention include, but are not limited to, the following:

U.S. Pat. No. 4,451,731 to Leonard, May 29, 1984;
U.S. Pat. No. 7,102,123 to Chin et al., Sep. 5, 2006;
U.S. Pat. No. 7,182,248 to Foo et al., Jun. 10, 2008;
U.S. Pat. No. 7,342,671 to Ito, Mar. 11, 2008;
U.S. Pat. No. 7,385,178 to Ng et al., Nov. 11, 2008.
U.S. Pat. No. 7,400,269 to Wong et al., Jul. 15, 2008;
U.S. Pat. No. 7,394,061 to Saidan et al., Jul. 1, 2008;
U.S. Patent Publication No. 2006/0007451 to Ito, Jan. 12, 2006
U.S. Patent Publication No. 2006/0237540 to Saxena et al., Oct. 26, 2006, and
U.S. Pat. No. 2008/0024797 to Otsuka et al., Jan. 21, 2008.

The dates of the foregoing publications may correspond to any one of priority dates, filing dates, publication dates and issue dates. Listing of the above patents and patent applications in this background section is not, and shall not be construed as, an admission by the applicants or their counsel that one or more publications from the above list constitutes prior art in respect of the applicant's various inventions. All printed publications and patents referenced herein are hereby incorporated by referenced herein, each in its respective entirety.

Upon having read and understood the Summary, Detailed Description and Claims set forth below, those skilled in the art will appreciate that at least some of the systems, devices, components and methods disclosed in the printed publications listed herein may be modified advantageously in accordance with the teachings of the various embodiments of the present invention.

SUMMARY

In some embodiments, there is provided a reflective optical encoder package comprising an integrated circuit comprising a light detector formed on or near a first substantially planar surface thereof, the integrated circuit further comprising at least one recess formed in or near the first surface and configured to accept a light emitter therewithin, a second substantially planar surface opposing the first surface, and a first optically transmissive pre-formed layer disposed over the light detector and the light emitter and attached to at least portions of the first surface, wherein the light emitter, the first layer and the light detector are configured to permit at least a portion of light emitted by the light emitter to traverse the first layer in an upward direction for reflection from a code scale disposed above the reflective optical encoder package and thence downwardly through the first layer for detection by the light detector.

In other embodiments, there is provided a method of making a reflective optical encoder package comprising forming a recess in or near a first substantially planar surface in an integrated circuit having a light detector formed on or near the first surface, the integrated circuit or substrate having a second substantially planar surface opposing the first surface, disposing a light emitter in the recess, and disposing a first optically transmissive pre-formed layer over the light detector and the light emitter and attaching the first layer to at least portions of the first surface, wherein the light emitter, the first layer and the light detector are configured to permit at least a portion of light emitted by the light emitter to traverse the first layer in an upward direction for reflection from a code scale disposed above the reflective optical encoder package and thence downwardly through the first layer for detection by the light detector.

Further embodiments are disclosed herein or will become apparent to those skilled in the art after having read and understood the specification and drawings hereof.

BRIEF DESCRIPTION OF THE DRAWINGS

Different aspects of the various embodiments of the invention will become apparent from the following specification, drawings and claims in which:

FIG. 1(a) shows a top perspective view of one embodiment of a reflective optical encoder package;

FIG. 1(b) shows a side view of the reflective optical encoder package of FIG. 1(a);

FIG. 2 shows one embodiment of a dual track reflective optical encoder package;

FIG. 3 shows one embodiment of a three track reflective optical encoder package;

FIG. 5 shows a side view of another embodiment of a reflective optical encoder package;

FIG. 6 shows a top perspective view of yet another embodiment of a reflective optical encoder package;

FIG. 7 shows a top perspective view of still another embodiment of a reflective optical encoder package;

FIG. 10(a) shows a side view of one embodiment of a rotary system employing a reflective optical encoder package;

FIG. 10(b) shows a cross-sectional view of the rotary system of FIG. 10(a);

FIG. 11(a) shows a side view of another embodiment of a rotary system employing a reflective optical encoder package; and FIG. 11(b) shows a cross-sectional view of the rotary system of FIG. 11(a).

The drawings are not necessarily to scale. Like numbers refer to like parts or steps throughout the drawings, unless otherwise noted.

DETAILED DESCRIPTIONS OF SOME PREFERRED EMBODIMENTS

Figure 4A:
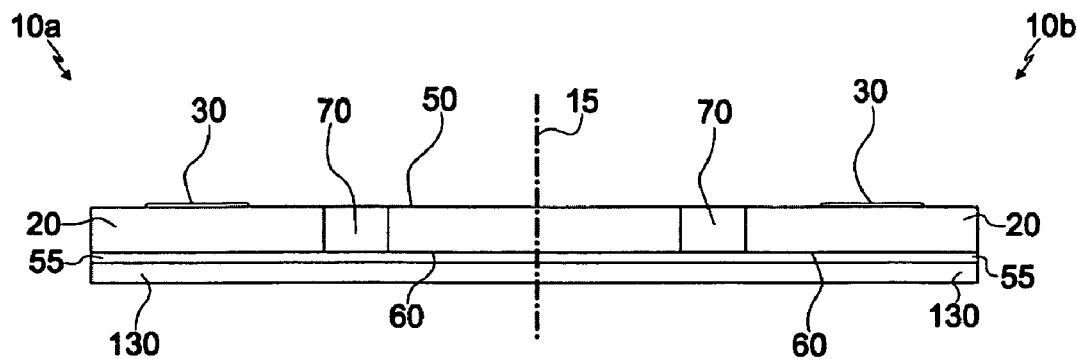
FIG. 4(a) shows a cross-sectional view of a reflective optical encoder according to a first step in one embodiment of a method.

In various embodiments of the invention, wafer level packaging is employed to provide glass layers disposed above and/or below an integrated circuit having a light detector and a light emitter disposed therein or thereon. Corresponding components, devices, systems and methods are also provided. The various embodiments of the invention permit a reflective optical encoder package to be provided which is of small size.

FIG. 1(a) shows a top perspective view of one embodiment of reflective optical encoder package 10. FIG. 1(b) shows a side view of the reflective optical encoder package of FIG. 1(a). Included in package 10 of FIGS. 1(a) and 1(b) is integrated circuit 20 comprising light detector 30 formed on or near first substantially planar top surface 50 thereof. Integrated circuit 20 further comprises at least one recess 70 formed in or near first surface 50. Recess 70 is configured to accept light emitter 40 therewithin.

First optically transmissive layer 80 is disposed over light detector 30 and light emitter and attached to at least portions of first surface 50. Second substantially planar surface 60 forms a bottom surface of integrated circuit 20, and opposes first surface 50. According to some embodiments, second glass layer 130 is disposed beneath integrated circuit 20 and attached to the underside thereof through attachment to at least portions of the second surface. Alternatively, a flexible printed circuit or a printed circuit board may be attached to the second surface.

In one embodiment, and as shown in FIGS. 1(a) and 1(b), first and second optically transmissive layers 80 and 130 are attached to the first and second surfaces by epoxy layers 57 and 55, respectively, where the epoxy or other suitable adhesive is disposed over or in contact with at least portions of the first and second surfaces 50 and 60 or other portions of integrated circuit 20. Note that according to the particular embodiment at hand, package 10 may include only one of optically transmissive layers 80 and 130, or may include both of optically transmissive layers 80 and 130.

Optically transmissive layers 80 and 130 have certain advantages compared to other materials employed to form prior art optical reflective encoders. For example, in comparison to conventional techniques employing transparent epoxy to form layers over light emitters and light detectors in prior art encoders, pre-formed optically transmissive layers 80 and 130 are formed from materials such as glass, plastic or epoxy that do not suffer from the dimensional, structural or stress-induced instabilities and/or inaccuracies introduced by shrinkage and other changes that occur as epoxy cures on integrated circuit 20. In addition to its structural and dimensional stability, pre-formed glass or plastic layers 80 and 130 also preferably possesses significant structural rigidity and strength, which are imparted to package 10 in consequence of one or more pre-formed glass or plastic optically transmissive layers 80 and 130 being integrated therein.

Optically transmissive layers 80 and 130 permit manufacturing costs and times to be reduced in respect of conventional epoxy overlay methods, as the entire packaging process may be carried out at the integrated circuit foundry. The precision and accuracy of light emitter and light detector placement directly on integrated circuit 20 may also be increased in respect of conventional epoxy optical encoder packaging techniques, which permits stack-up tolerances to be reduced and encoder performance to be improved; such encoder performance improvements can become especially important in respect of certain types of optical encoders, such as optical radius encoder systems.

Coefficient of Thermal Expansion (CTE) mismatches arising between different mold compounds are also eliminated through the use of optically transmissive layers 80 and 130, since no casting or transfer molding processes need be employed to fabricate package 10. In addition, optically transmissive layer 80 may be configured and dimensioned so that no separate lens is required to be disposed thereover or thereabove, which permits the height of package 10 to be reduced respecting conventional optical encoder packages. Optical encoder package 10 may also be made smaller than many conventional encoders. For example, in one embodiment optically transmissive layer 80 eliminates the need for a separate lens to be included in package 10, which reduces the height of package 10. The reliability and yield of optical encoder package 10 may be increased in respect of conventional IC packaging techniques (such as those which employ transfer molding and casting) because of the inherent dimensional and structural stability of optically transmissive layers 80 and 130, and also because according to one embodiment the encoder manufacturing process occurs at the wafer level only, and no wire bonding processes are required to establish electrical connections to light emitter 40 or light detector 30. Note further that the top and/or bottom surfaces of optically transmissive layer 80 may be shaped, machined or configured to collimate light emitted by light emitter 40 in a preferred direction or orientation. Such top or bottom surfaces of optically transmissive layer 80 may assume spherical, aspherical, compound or other lens shapes.

Continuing to refer to FIGS. 1(a) and 1(b), light emitter 40, first optically transmissive layer 80, and light detector 30 are together configured to permit at least a portion of light emitted from light emitter 40 to traverse first optically transmissive layer 80 in an upward direction for reflection from a code scale (not shown in the Figures) disposed above reflective optical encoder package 10 and thence downwardly through first optically transmissive layer 80 for detection by light detector 30. Any of a number of different suitable code scales may be employed in conjunction with reflective optical encoder package 10, such as a code wheel, one or more code strips, or a code disk.

Recess 70 in integrated circuit 20 may be formed by any one or more of etching, chemical etching, drilling or ultrasonic drilling, a portion of integrated circuit 20. According to one embodiment, light emitter 40 may be secured to or in recess 70 with a suitable adhesive, such as epoxy. Recess 70 is configured to receive light emitter 40 therein, which may comprise one or more light emitting diodes (LEDs) or other suitable sources of light. Light detector 30 comprises one or more photodetectors such as, by way of example, photodiodes or charge-coupled devices (CCDs). As mentioned above, light emitter 40 and light detector are spaced and dimensionally configured in respect of one another to permit light emitted by light emitter 40, and that is reflected from a code scale disposed above package 10, to be detected by detector 30.

Note that in one embodiment integrated circuit 20 shown in the Figures may comprise a detector integrated circuit having light detector 30 forming a portion thereof and containing recess 70 and light emitter 40. Electrical connections to light emitter 40 and light detector 30 may be established in any of a number of ways known to those skilled in the art. According to a one embodiment, integrated circuit 20 is configured to permit direct electrical connection between light detector 30 and circuitry disposed within integrated circuit, and between light emitter 40 and circuitry disposed within integrated circuit, such that no wirebonds or external bond pads are required to establish such electrical connections. In another embodiment, an emitter bond pad 180a is connected to light detector 30 by means of a bond pad extension 182a (see, for example, FIGS. 4(b)-4(h)). In other embodiments, solder pads and/or solder extension pads, vias (such as Through Silicon Vias or "TSVs") or the like, or any combination of the foregoing or other techniques well known to those skilled in the art may be employed to establish electrical connections between these or other electrical or electronic components. When TSVs are employed, sloped surfaces of the package sides are no longer required to form T-joints with pad extensions. Instead, pad extensions are electrically connected to bottom optically transmissive layer 130 using TSVs. Additionally, and as shown in FIGS. 1(a) and 1(b), solder balls arranged in a ball grid array ("BGA") 164 may be disposed on package 10 to establish electrical connections between the various components of package 10 and external devices and/or systems. Various surface mount ("SMT") processes may be employed in various embodiments of the methods and steps described herein.

According to one embodiment, integrated circuit 20 comprises a position logic device, which may be any suitable processing or logic device, such as a controller, ASIC, processor, micro-processor, micro-controller, CPU; or any combination of appropriate logic hardware and/or software configured to modulate and control light emitter 40 and light detector 30, and to process in at least a preliminary fashion the light signals detected by detector 40. In one embodiment, integrated circuit 20 is a semiconductor device formed using wafer and other semiconductor manufacturing processes known in the art, and is an ASIC, processor, micro-processor, micro-controller, CPU, or any combination of suitable logic hardware and/or software. Note further that encoder package 10 may be configured to provide analog or digital output signals therefrom.

Referring now to FIG. 2, there is shown another embodiment of reflective optical encoder package 10, where recess 70, light emitter 40, and light detector 30 are disposed on or positioned in integrated circuit 20 such that package 10 is configured for operation in conjunction with an associated code scale as a two-channel optical encoder package. In a preferred embodiment, such package 10 comprises one light detector track comprising two signal channels two signal channels and an index channel, and/or an absolute track featuring Maximum Length Sequence ("MLS") coding.

FIG. 3 shows yet another embodiment of reflective optical encoder package 10, where recess 70, light emitter 40, and light detectors 30a and 30b are disposed on or positioned in integrated circuit 20 such that package 10 may be configured for operation as a three-channel optical encoder package, where an additional light detector track permits signal compensation through redundancy (e.g., pre- and post-scanning of code tracks) and so on FIGS. 4(a) through 4(h) illustrate one embodiment of a method of making reflective optical encoder package 10, which includes various wafer fabrication and semiconductor packaging steps, more about which we now say. Referring now to FIG. 4(a), there is shown a cross-sectional view of reflective optical encoder package 10 according to a first step in such an embodiment and method. In FIG. 4(a) integrated circuit 20 is attached to second optically transmissive layer 130 by epoxy or another suitable adhesive 55. Recess, hole or slot 70 for light emitter 40 is formed or provided in integrated circuit 20, where such recess 70 may or may not extend between first and second surfaces 50 and 60 of integrated circuit 20. Saw street 15 separates one package 10a on the left-hand side of FIG. 4(a) from another package 10b on the right-hand side of FIG. 4(a). Light detectors 30 are provided on or in integrated circuit 20.

Figure 4B:
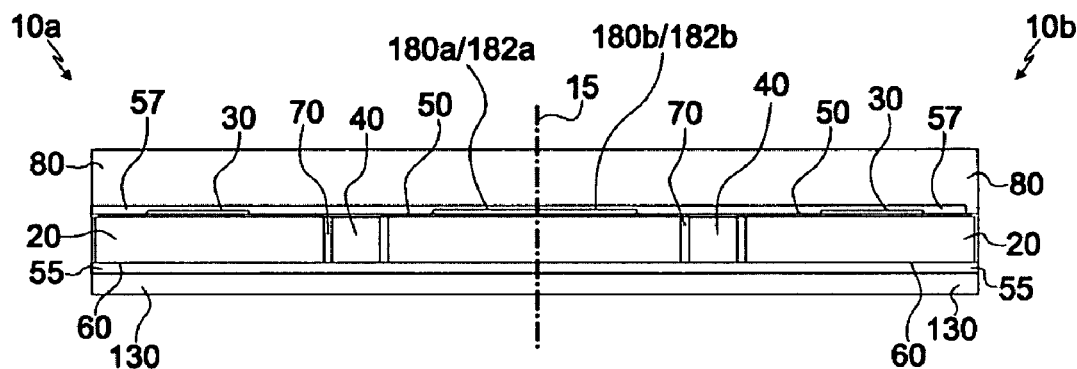
FIG. 4(b) shows a cross-sectional view of a reflective optical encoder according to a second step in one embodiment of a method.

FIG. 4(b) shows a next step in the method, where light emitter 40 is placed in recess or slot 70 and glued in position with epoxy or another suitable adhesive and emitter bond pad 182a and 182b are electrically connected between emitters 40 and integrated circuit 20 by means of bond pad extensions 180a and 180b. In an alternative embodiment, bond pads 182a and 182b, and bond pad extensions 180a and 180b are electrically connected to emitters 40 and bypass integrated circuit 20 for electrical connection to an external device or connection. As shown in FIG. 4(b), and in a preferred embodiment, all detector bond pads or bond pad extensions connected thereto extend to saw street 15 so as to facilitate and provide electrical connectivity between package 10 and external devices and/or systems at a later stage. Optically transmissive layer 80 is next attached to first surface 50 by means of epoxy or another suitable adhesive 57, or by alternative means known to those skilled in the art, such as by sputtering, molding or mechanical connection to or compression against integrated circuit 20.

Figure 4C:
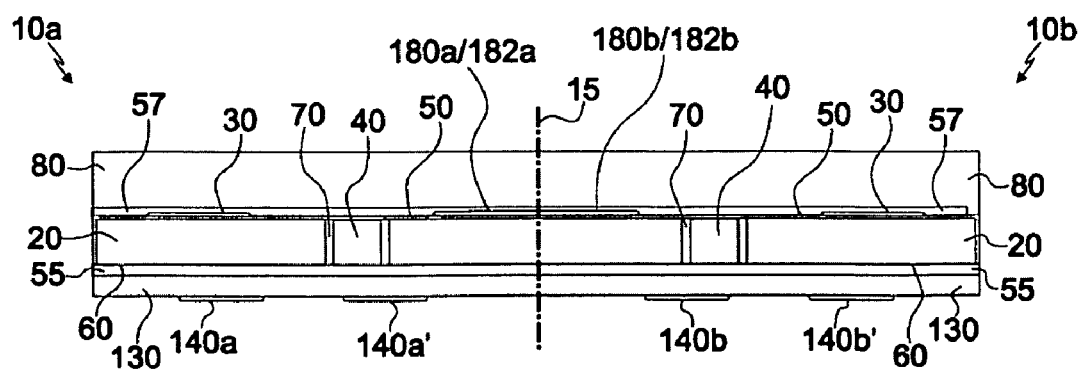
FIG. 4(c) shows a cross-sectional view of a reflective optical encoder according to a third step in one embodiment of a method.

FIG. 4(c) shows another step in the method, where compliant metallized layers 140a, 140a', 140b, 140b' are disposed on an exterior surface of second glass layer 130. These metallized layers are configured to facilitate the establishment of subsequent electrical connections between one or more of light emitters 40 and light detectors 30 disposed inside the package and devices or systems external to packages 10a and 10b.

Figure 4D:
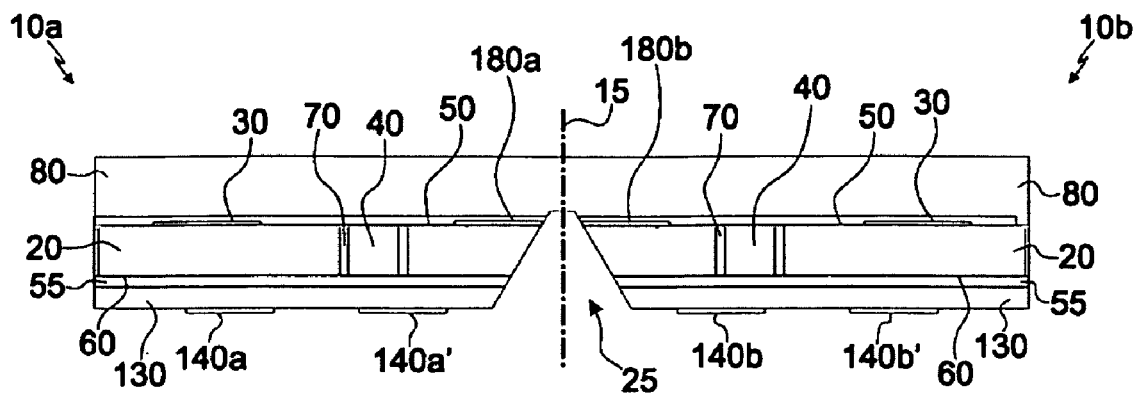
FIG. 4(d) shows a cross-sectional view of a reflective optical encoder according to a fourth step in one embodiment of a method.

Next, and as shown in FIG. 4(d), notch 25 is formed between the left-hand package 10a and the right-hand package 10b, where notch 25 is centered along saw street 15, and reveals or lays bare bond pad extensions 180a and 180b.

Figure 4E:
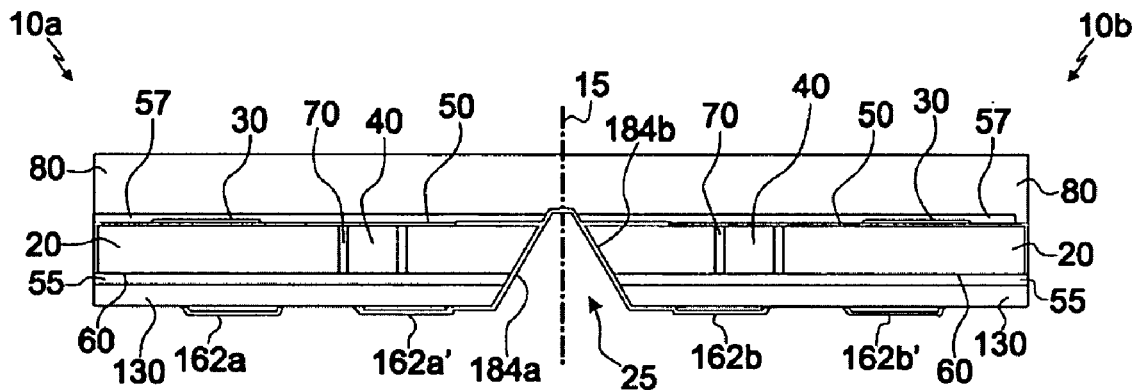
FIG. 4(e) shows a cross-sectional view of a reflective optical encoder according to a fifth step in one embodiment of a method.
Figure 4F:
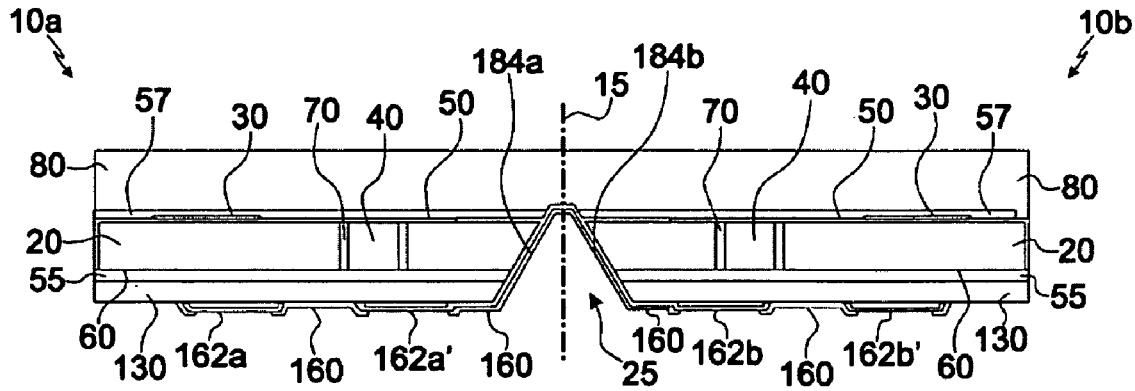
FIG. 4(f) shows a cross-sectional view of a reflective optical encoder according to a sixth step in one embodiment of a method.
Figure 4G:
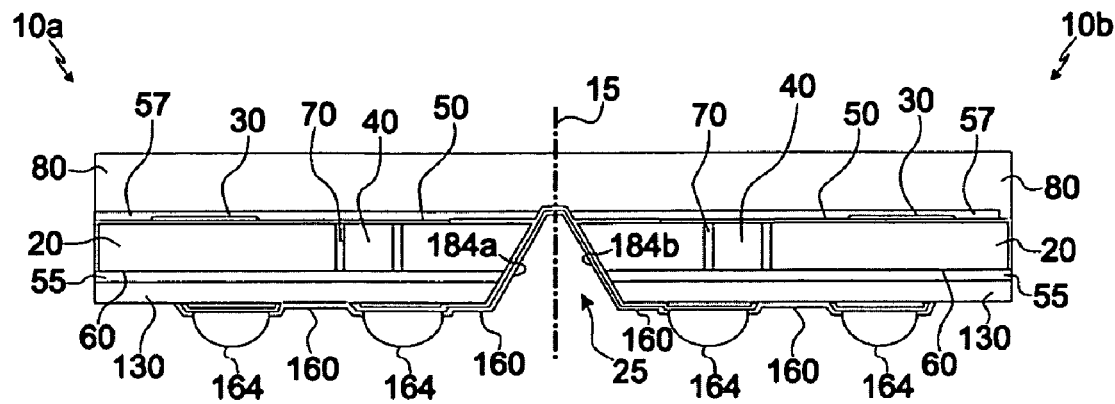
FIG. 4(g) shows a cross-sectional view of a reflective optical encoder according to a seventh step in one embodiment of a method.
Figure 4H:
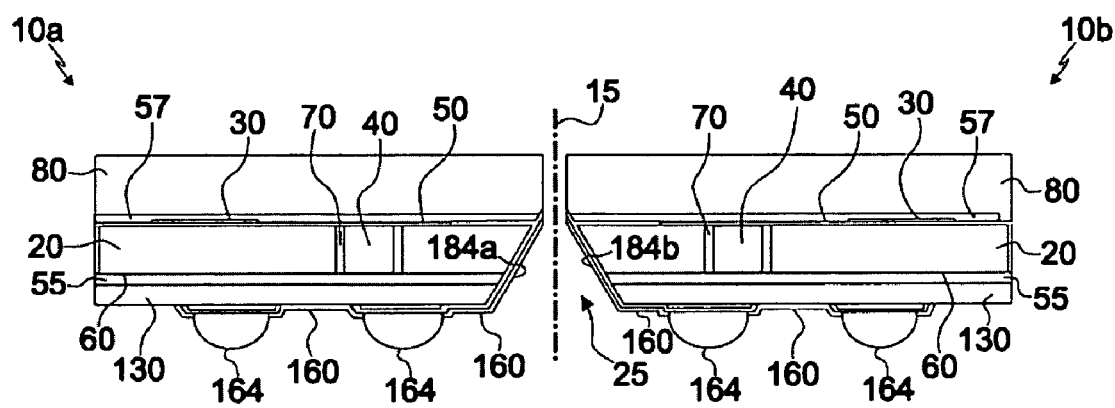
FIG. 4(h) shows a cross-sectional view of a reflective optical encoder according to an eighth step in one embodiment of a method.

As shown in FIG. 4(e), external leads 184a and 184b are formed to electrically connect bond pad extensions 180a and 180b to solder leads 162a, 162a', 162b and 162b' along with solder mask 160 shown in FIG. 4(f). Solder bumps 164 are then formed beneath solder leads 162a, 162a', 162b and 162b', as shown in FIG. 4(g). Finally, right-hand package 10a is separated from right-hand package 10b by wafer sawing or cutting along saw street 15.

After having read and understood the present specification and accompanying drawings, those skilled in the art will now understand that many variations on, or combinations and permutations of, the foregoing steps and methods may be made without departing from the scope and spirit of the invention. For example, the method described above may be supplemented by adding a lens over first optically transmissive layer 80, by disposing an air trench or light barrier between light emitter 40 and light detector 30 (more about which we say below), or by performing the steps in a different order from that presented herein.

Referring now to FIG. 5, there is shown another embodiment of reflective optical encoder package 10, where recess 70 is etched, drilled or otherwise formed such that recess 70 extends only partially through integrated circuit 20. Accordingly, in such an embodiment it is not required that the respective thicknesses of emitter 40 and integrated circuit 20 be the same or substantially equivalent, which permits emitters 40 having a wide range of thicknesses to be employed in package 10.

FIGS. 6 and 7 shows top perspective views of further embodiments of reflective optical encoder package 10, where lens 190 or lenses 190a and 190b are disposed above glass layer 80 and attached thereto via lens substrate or base 192. The embodiment shown in FIG. 6 has a single domed lens 190, while the embodiment shown in FIG. 7 comprises dual domed lenses 190a and 190b. Other types of lenses are also contemplated for use in package 10, such as spherical lenses, aspherical lenses, compound lenses, triple lenses, and any other lens or lenses of suitable shape, configuration, form factor and/or operation. Such lenses may be formed of glass, plastic, translucent or transparent epoxy, or any other suitable optically transmissive material.

Figure 8:
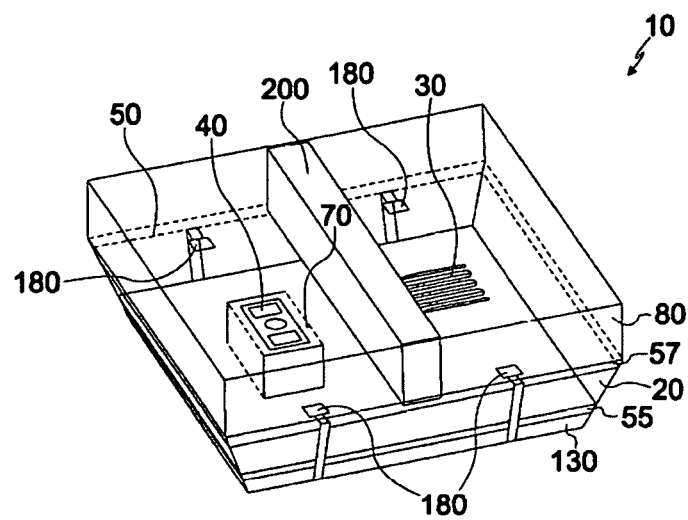
FIG. 8 shows a top perspective view of another embodiment of a reflective optical encoder package having a light barrier disposed therein.

Referring now to FIG. 8, there is shown another embodiment of reflective optical encoder package 10, which comprises light barrier or air trench 200 disposed between light emitter 40 located on one side of package 10, and light detector 30 located on another side of package 10. Air trench or light barrier 200 is configured to intercept undesired stray light emitted by light emitter 40, or undesired stray light that has been refracted, reflected or scattered from other portions of package 10 or the code scale or other components disposed thereabove or therearound, such that the stray light does not impinge upon light detector 30, or in the alternative has a reduced magnitude or amplitude that does not affect substantially the dynamic range of light detector 30. Light barrier 200 may be formed from any suitable optically opaque material such as a suitable plastic, metal or alloy. In the case where an air trench is employed, region 200 disposed between light emitter 40 and light detector 30 may be formed by cutting or otherwise forming an air gap in such region, laser ablating, chemically treating, or otherwise modifying region 200 such that light rays incident thereon are reflected, diffracted or scattered away from light detector 30. Other aspects of package 10 in the embodiment shown in FIG. 8 may otherwise be similar or the same as those shown in the preceding Figures.

Figures 9A, 9B:
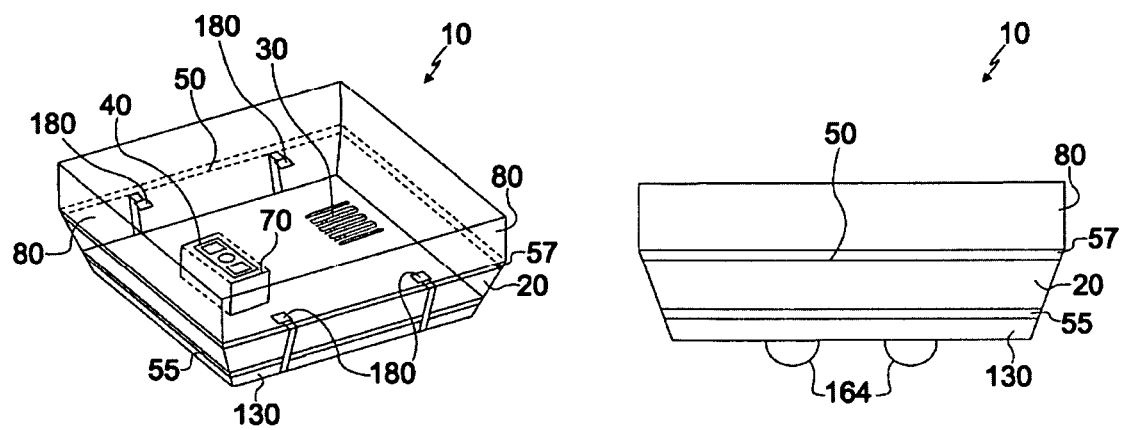
FIG. 9(a) shows a top perspective view of another embodiment of a reflective optical encoder package having a 4-pin output.
FIG. 9(b) shows a side view of the reflective optical encoder package of FIG. 9(b)

FIGS. 9(a) and 9(b) show top perspective and side views of still another embodiment of reflective optical encoder package 10, where the number of output pins is minimized, which permits still further reductions in the size or form factor of package 10 to be realized. As shown in FIGS. 9(a) and 9(b), two channel reflective optical encoder package 10 has only four output pins: $V_{cc}$, ground, channel A, and channel B. In the embodiment illustrated in FIGS. 9(a) and 9(b), light detector 30 and light emitter 40 are both connected to a common single pin, which is configured to provide the supply voltage ($V_{cc}$) to both devices.

FIG. 10(a) shows a side view of one embodiment of rotary system 220 employing one embodiment of reflective optical encoder package 10. FIG. 10(b) shows a cross-sectional view of rotary system 220 of FIG. 10(a). FIGS. 10(a) and 10(b) illustrate one embodiment of the adaptation of reflective optical encoder package 10 for use in rotary system 220 comprising rotary codewheel 210, where codewheel 210 has central hole 230 disposed therethrough and outer diameter 240. Codewheel 210 is attached to hub 255, which in turn is mounted on or to rotating shaft 250 driven by motor 260. Flex circuit or assembly 100 forms a substrate upon which encoder package 10 is mounted, which in turn is configured to sense the rotation of codewheel 210. Flex circuit or assembly 100 is preferably attached to a housing (not shown in the Figures) configured to provide the appropriate clearance or spacing between package 10 and codewheel 210.

In the embodiment of rotary system 220 shown in FIGS. 10(a) and 10(b), outer diameter 240 of codewheel 210 is configured to align precisely codewheel 210 with shaft 250 and hub 255 of motor 260. Inner hole 230 has a flanged rim formed about the periphery thereof which automatically aligns codewheel 210 in respect of shaft 250 and hub 255. Such a construction, however, consumes valuable space on codewheel 210 and limits the smallest diameter of codewheel 210 that can be achieved. Hole 230, when punched through or otherwise formed in codewheel 210, can cause codewheel 210 to become warped, and also consumes valuable $R_{op}$ (or optical radius) of codewheel 210, which in turn limits the area and types of patterns that may be disposed on codewheel 210. As a result, rotary systems 220 illustrated in FIGS. 10(*a*) through 11(*b*) in small motor applications can be rather severely limited in implementation owing to small size limitations that may not be achievable using film codewheels.

Referring now to FIGS. 11(*a*) and 11(*b*), there is shown another embodiment of rotary system 220 that overcomes some of the disadvantages of rotary systems 220 shown in FIGS. 10(*a*) through 11(*b*). Note that in the embodiment of rotary system 220 shown in FIGS. 11(*a*) and 11(*b*), no central hole 230 is formed provided in codewheel 210. Instead, outer diameter 240 of codewheel 210 forms a flanged outer periphery within which codewheel 210 is disposed and supported. The guiding or aligning feature of system 220 is codewheel 230's outer diameter 240, and the flanged outer periphery thereof, which supplants the aligning mechanism provided by flanged periphery of hole or aperture 230, thereby eliminating central hole or aperture 230 and the problems attendant thereto. Shaft 250 engages hub 255, which supports codewheel 230 thereatop. In the embodiment of rotary system 220 shown in FIGS. 11(*a*) and 11(*b*), the lack of a central hole or aperture 230 permits the $R_{op}$ to be maximized, along with the area of codewheel 210 which becomes available for the disposal of optical patterns, strips and codes thereon.

The various embodiments of the reflective optical encoder packages disclosed herein may be adapted or configured for use in many different types of optical encoders, including, but not limited to, incremental encoders, two- or three-channel incremental encoders, commutation encoders, commutation encoders with 6 channels, pseudo absolute encoders and absolute encoders.

Included within the scope of the present invention are methods of making and having made the various components, devices and systems described herein.

The above-described embodiments should be considered as examples of the present invention, rather than as limiting the scope of the invention. In addition to the foregoing embodiments of the invention, review of the detailed description and accompanying drawings will show that there are other embodiments of the invention. Accordingly, many combinations, permutations, variations and modifications of the foregoing embodiments of the invention not set forth explicitly herein will nevertheless fall within the scope of the invention.

We claim:

1. A reflective optical encoder package, comprising:
an integrated circuit comprising a light detector formed on or near a first substantially planar surface thereof, the integrated circuit further comprising at least one recess formed in or near the first surface and configured to accept a light emitter therewithin, a second substantially planar surface opposing the first surface; and
a first optically transmissive pre-formed layer having a substantially planar bottom surface; the pre-formed layer being disposed over the light detector and a light emitter positioned in the recess, the pre-formed layer being attached to at least portions of the first surface by means of at least one of epoxy, an adhesive, sputtering, and a mechanical connection;
wherein the light emitter, the first layer and the light detector are configured to permit at least a portion of light emitted by the light emitter to traverse the first layer in an upward direction for reflection from a code scale disposed above the reflective optical encoder package and thence downwardly through the first layer for detection by the light detector; and
a second optically transmissive pre-formed layer disposed beneath the integrated circuit and attached to the second surface, wherein no part of the second pre-formed layer is in direct contact with any part of the first pre-formed layer.

2. The reflective optical encoder package of claim 1, wherein the second layer is attached to the second surface with an adhesive.

3. The reflective optical encoder package of claim 1, wherein the top surface of the pre-formed layer is one of substantially planar, substantially spherical, and substantially aspherical.

4. The reflective optical encoder package of claim 1, wherein at least one of the first optically transmissive pre-formed layer and the second optically transmissive pre-formed layer comprises glass, plastic or epoxy.

5. The reflective optical encoder package of claim 1, further comprising a bond pad electrically connected to at least one of the light emitter and the light detector.

6. The reflective optical encoder package of claim 1, wherein a lens is disposed over the first optically transmissive pre-formed layer.

7. The reflective optical encoder package of claim 1, wherein an air trench or light barrier is disposed between the light emitter and the light detector.

8. A method of making a reflective optical encoder package, comprising:
forming a recess in or near a first substantially planar surface in an integrated circuit, the integrated circuit having a light detector formed on or near the first surface, the integrated circuit having a second substantially planar surface opposing the first surface;
positioning a light emitter in the recess, and
positioning a first optically transmissive pre-formed layer having a substantially planar bottom surface over the light detector and the light emitter and attaching the first layer to at least portions of the first surface by at least one of epoxy, an adhesive, sputtering, and a mechanical connection; wherein the light emitter, the first layer and the light detector are configured to permit at least a portion of light emitted by the light emitter to traverse the first layer in an upward direction for reflection from a code scale disposed above the reflective optical encoder package and thence downwardly through the first layer for detection by the light detector; and
disposing a second optically transmissive pre-formed layer beneath the integrated circuit and attaching the second layer to the second substrate surface; wherein no part of the second pre-formed layer is in direct contact with any part of the first pre-formed layer.

9. The method of claim 8, further comprising disposing and positioning the recess, the light emitter and the light detector on or in the integrated circuit such that the package is configured for operation as a two-channel optical encoder package or a three-channel optical encoder package.

10. The method of claim 8, further comprising providing the first optically transmissive pre-formed layer formed from one of glass, plastic and epoxy.

11. The method of claim 8, further comprising electrically connecting a bond pad to at least one of the light emitter and the light detector.

12. The method of claim 8, further comprising disposing a lens over the first optically transmissive pre-formed layer.

13. The method of claim 8, further comprising disposing an air trench or light barrier between the light emitter and the light detector.

14. The method of claim 8, further comprising operably configuring the package in respect of a corresponding rotary codewheel configured to operate as the code scale in a rotary system.

15. The method of claim 14, further comprising providing the codewheel with no inner hole disposed in a central portion thereof.

16. The method of claim 14, further comprising configuring an outer diameter of the codewheel as a guiding or aligning feature in respect of a corresponding hub or shaft.

* * * * *